(12) United States Patent
Lee et al.

(10) Patent No.: US 7,870,743 B2
(45) Date of Patent: Jan. 18, 2011

(54) COMPOUND NOZZLE COOLED ENGINE

(75) Inventors: Ching-Pang Lee, Cincinnati, OH (US); Thomas Ory Moniz, Loveland, OH (US); Robert Joseph Orlando, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1286 days.

(21) Appl. No.: 11/595,669

(22) Filed: Nov. 10, 2006

(65) Prior Publication Data

US 2008/0112794 A1   May 15, 2008

(51) Int. Cl.
*F02C 6/08* (2006.01)
(52) U.S. Cl. .............................. 60/782; 60/785; 60/795; 60/806; 416/96 R; 416/97 R
(58) Field of Classification Search ............... 60/782, 60/785, 795, 806; 416/96 R, 97 R
See application file for complete search history.

(56) References Cited

U.S. PATENT DOCUMENTS

| | | | |
|---|---|---|---|
| 3,034,298 | A | 5/1962 | White |
| 4,080,785 | A | 3/1978 | Koff et al. |
| 4,741,153 | A | 5/1988 | Hallinger et al. |
| 4,852,355 | A | 8/1989 | Kenworthy et al. |
| 5,134,844 | A | 8/1992 | Lee et al. |
| 5,135,354 | A | 8/1992 | Novotny |
| 5,142,859 | A | 9/1992 | Glezer et al. |
| 5,174,105 | A | 12/1992 | Hines |
| 5,232,339 | A | 8/1993 | Plemmons et al. |
| 5,288,210 | A | 2/1994 | Albrecht et al. |
| 5,317,877 | A | 6/1994 | Stuart |
| 5,472,313 | A | 12/1995 | Quinones et al. |
| 5,498,126 | A | 3/1996 | Pighetti |
| 5,555,721 | A | 9/1996 | Bourneuf et al. |
| 5,611,197 | A * | 3/1997 | Bunker ........................ 60/806 |
| 5,996,331 | A | 12/1999 | Palmer |
| 6,050,079 | A | 4/2000 | Durgin et al. |

(Continued)

FOREIGN PATENT DOCUMENTS

DE        2065334 A1    4/1973

(Continued)

OTHER PUBLICATIONS

General Electric Company, "CF6-80C2 Engine Airflow FADEC Control," Engine in public use and on sale in US more than one year before Sep. 1, 2006, single page.

(Continued)

*Primary Examiner*—Michael Cuff
*Assistant Examiner*—Craig Kim
(74) *Attorney, Agent, or Firm*—William S. Andes; Francis L. Conte (57) ABSTRACT

A gas turbine engine includes a compressor, combustor, and high pressure turbine operatively joined together. The turbine includes a nozzle followed by a row of rotor blades. A first bleed circuit is joined in flow communication between the last stage of the compressor and a forward cooling channel in vanes of the nozzle for feeding first cooling holes therein with pressurized primary air at a first pressure. A second bleed circuit is joined in flow communication between an intermediate stage of the compressor and aft cooling channels in the nozzle vanes to feed second cooling holes with pressurized secondary air at a second pressure less than the first pressure.

22 Claims, 4 Drawing Sheets

U.S. PATENT DOCUMENTS

| | | | |
|---|---|---|---|
| 6,092,991 A | 7/2000 | Tomita et al. | |
| 6,183,193 B1 | 2/2001 | Glasspoole et al. | |
| 6,220,814 B1 | 4/2001 | Brushwood et al. | |
| 6,331,097 B1 | 12/2001 | Jendrix | |
| 6,487,863 B1 | 12/2002 | Chen et al. | |
| 6,923,247 B1 * | 8/2005 | Ferber et al. | 165/47 |
| 6,960,060 B2 * | 11/2005 | Lee | 415/115 |
| 6,981,841 B2 | 1/2006 | Krammer et al. | |
| 2004/0179936 A1 | 9/2004 | Fitzgerald et al. | |
| 2005/0111964 A1 * | 5/2005 | Krammer et al. | 415/115 |

FOREIGN PATENT DOCUMENTS

| | | |
|---|---|---|
| EP | 0584958 A1 | 3/1994 |
| EP | 0543627 A1 | 5/1996 |
| EP | 0768448 A1 | 4/1997 |
| EP | 1262634 A2 | 12/2002 |
| EP | 1306521 A1 | 5/2003 |
| EP | 1503061 A1 | 2/2005 |
| EP | 1505254 A2 | 2/2005 |
| EP | 1528238 A1 | 5/2005 |
| EP | 1621734 A1 | 2/2006 |
| EP | 1643081 A2 | 4/2006 |
| GB | 2081392 A | 2/1982 |
| GB | 2420155 A | 5/2006 |

OTHER PUBLICATIONS

General Electric Company, "CFM56-5C2-CDP Air for Turbine Cooling," Engine in public use and on sale in US more than one year before Sep. 1, 2006, two pages.

U.S. Appl. No. 11/595,606, filed Nov. 10, 2006, by Ching-Pang Lee et al.

U.S. Appl. No. 11/595,670, filed Nov. 10, 2006, by Ching-Pang Lee et al.

U.S. Appl. No. 11/595,668, filed Nov. 10, 2006, by Ching-Pang Lee et al.

* cited by examiner

COMPOUND NOZZLE COOLED ENGINE

BACKGROUND OF THE INVENTION

The present invention relates generally to gas turbine engines, and, more specifically, to turbine cooling therein.

In a gas turbine engine, air is pressurized in a compressor and mixed with fuel in a combustor for generating hot combustion gases. Energy is extracted from the combustion gases in turbine stages which power the compressor through one drive shaft, and produce additional work for powering an upstream fan in a turbofan aircraft engine application, or driving an external drive shaft for marine and industrial (M&I) applications.

The basic core engine typically includes a multistage axial compressor having rows of compressor blades and corresponding guide vanes which pressurize ambient air in stages and correspondingly increase the temperature thereof. The air discharged from the aft end of the compressor has the highest pressure, commonly referred to as compressor discharge pressure (CDP), and a correspondingly high temperature.

In an exemplary configuration, the compressor may have seven stages for increasing air pressure many times atmospheric pressure along with many hundreds of degrees of temperature increase due to the compression cycle. A fewer or greater number of compression stages may be used as desired for the specific design of the gas turbine engine and its intended use.

A majority of the CDP air discharged from the compressor is mixed with fuel in the combustor for generating hot combustion gases. These combustion gases then undergo an expansion cycle in the several turbine stages for extracting energy therefrom which correspondingly reduces the pressure of the combustion gases and the temperature thereof. A high pressure turbine (HPT) immediately follows the combustor and is used to power the compressor blades in the core engine.

A low pressure turbine (LPT) follows the HPT and drives the second shaft for powering the upstream fan in the turbofan engine application, or driving an external drive shaft for M&I applications.

The overall efficiency of the gas turbine engine is dependent on the efficiency of air compression, efficiency of combustion, and efficiency of combustion gas expansion in the turbine stages.

Since turbine components are directly exposed to hot combustion gases during operation, they require suitable cooling thereof to ensure long useful life. For example, some of the compressor discharge air is diverted from the combustion process for cooling liners of the combustor itself, as well as cooling various components of the HPT.

Each turbine stage typically includes an upstream turbine nozzle or stator having a row of nozzle vanes which direct the combustion gases downstream through a corresponding row of turbine rotor blades. The blades are typically mounted to the perimeter of a supporting rotor disk in corresponding dovetail slots formed therein.

The turbine blades and vanes are typically hollow airfoils with corresponding internal cooling channels therein which receive compressor discharge air for cooling thereof during operation. The hollow blades and vanes typically include various rows of film cooling and other discharge holes through the pressure and suction sidewalls thereof for discharging the spent internal cooling air in corresponding external films for further protecting the airfoils.

Furthermore, the turbine rotor disk which supports the first stage turbine blades is a relatively large component with a rim in which the blades are mounted, a narrow web extending radially inwardly therefrom which terminates in a wider hub having a central bore. The rotor disk is subject to both considerable centrifugal loads and heating during operation and must also be designed for long life.

In contrast, the LPT requires less cooling than the HPT in view of the reduction in combustion gas temperature and pressure during the expansion cycle. The cooling requirements are therefore reduced, and typically interstage bleed air may be used for cooling various components therein.

The main turbine flowpath is designed to confine the combustion gases as they flow through the engine and decrease in temperature and pressure from the combustor. The various cooling circuits for the turbine components are independent from the main flowpath and must be provided with cooling air at sufficient pressure to prevent ingestion of the hot combustion gases therein during operation.

For example, suitable rotary seals are provided between the stationary turbine nozzles and the rotating turbine blades to prevent ingestion or back flow of the hot combustion gases into the cooling circuits. Since the airfoils of the nozzle vanes and turbine blades typically include rows of cooling air outlet holes, the cooling air must have sufficient pressure greater than that of the external combustion gases to provide a suitable backflow margin to prevent ingestion of the hot combustion gases into the turbine airfoils themselves.

Accordingly, the components of the HPT are typically cooled using the full-pressure CDP air, whereas LPT components may be cooled using lower pressure, interstage bleed air.

In this way, the use of compressor air for cooling turbine components may be matched to the different cooling requirements of the HPT and the LPT for reducing the use thereof and therefore increasing engine efficiency.

However, increasing engine efficiency is a continuing and paramount design objective in modem gas turbine engines, and it is therefore desired to further increase engine efficiency by reducing pressurized air extracted from the compressor.

BRIEF DESCRIPTION OF THE INVENTION

A gas turbine engine includes a compressor, combustor, and high pressure turbine operatively joined together. The turbine includes a nozzle followed by a row of rotor blades. A first bleed circuit is joined in flow communication between the last stage of the compressor and a forward cooling channel in vanes of the nozzle for feeding first cooling holes therein with pressurized primary air at a first pressure. A second bleed circuit is joined in flow communication between an intermediate stage of the compressor and aft cooling channels in the nozzle vanes to feed second cooling holes with pressurized secondary air at a second pressure less than the first pressure.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
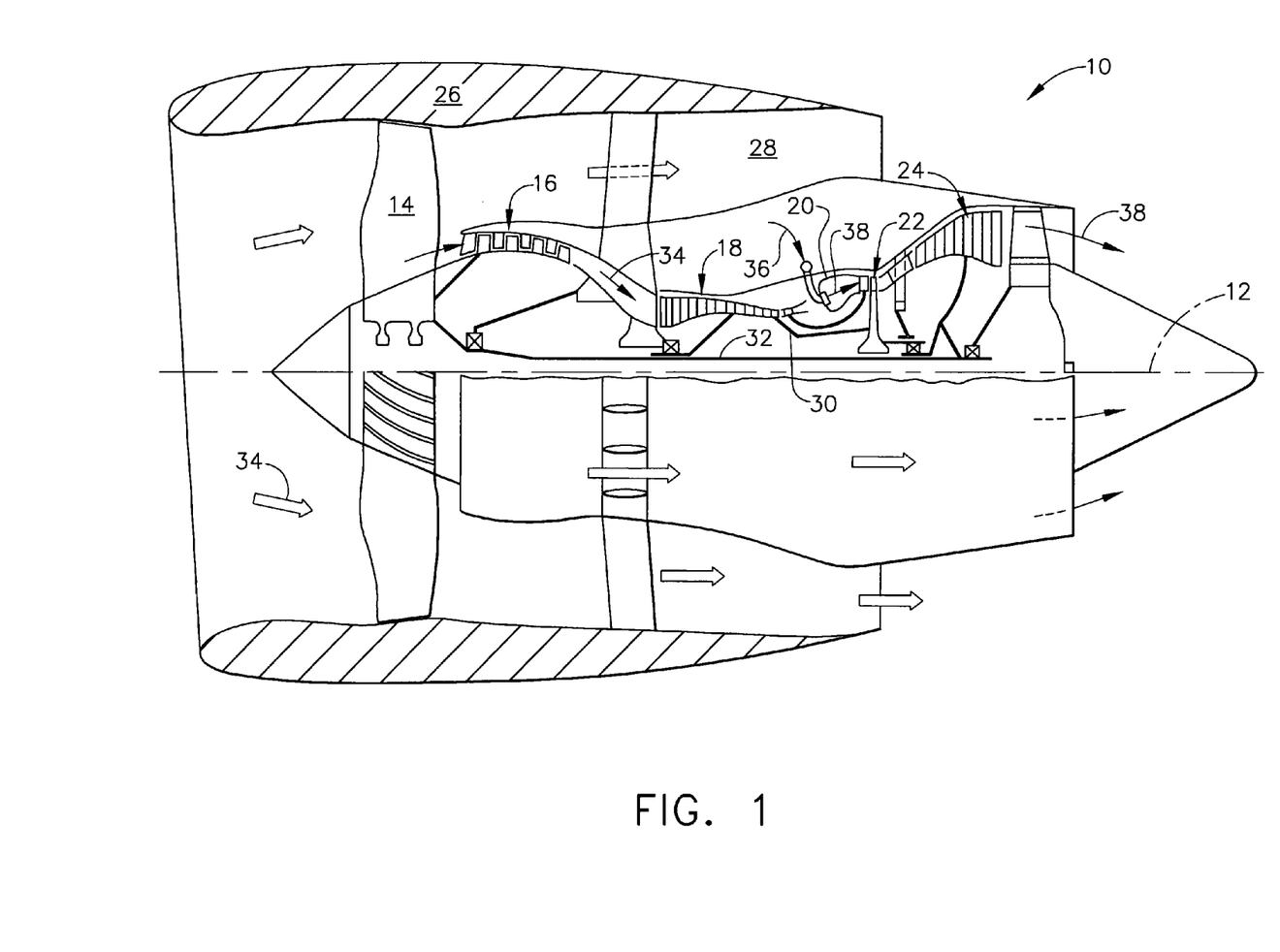
FIG. 1 is a partly sectional, axial schematic view of a turbofan gas turbine engine.

Illustrated schematically in FIG. 1 is an exemplary turbofan aircraft gas turbine engine 10. The engine is axisymmetrical about a longitudinal or axial centerline axis 12 and is suitably mounted to the wing or a fuselage of an aircraft (not shown) for powering an aircraft in flight in an exemplary application.

The engine includes in serial flow communication a fan 14, a low pressure or booster compressor 16, a high pressure (HP) compressor 18, an annular combustor 20, a high pressure turbine (HPT) 22, and a low pressure turbine (LPT) 24.

An annular nacelle 26 surrounds the fan 14 and defines an annular bypass duct 28 extending aft around the booster compressor 16. A first drive shaft 30 joins the HPT 22 to the HP compressor 18, and a second drive shaft 32 joins the LPT 24 to the fan 14 and booster compressor 16. The two drive shafts are suitably mounted in bearings in corresponding frames within the engine in a conventional configuration of the various engine components described above.

During operation, ambient air 34 enters the inlet of the engine and is pressurized in part by the fan 14 and discharged through the bypass duct 28 for providing a majority of propulsion thrust. Some of the air 34 passing the fan enters the booster compressor 16 and undergoes a further compression cycle in the multiple axial stages thereof, with additional compression also being provided in the HP compressor 18 in the multiple axial stages thereof.

The pressurized air 34 is discharged from the compressor and suitably mixed with fuel 36 in the combustor 20 for generating hot combustion gases 38. Energy is extracted from the combustion gases 38 in the HPT 22 to drive the first shaft 30 and power the HP compressor 18. Additional energy is extracted from the combustion gases in the LPT 24 to drive the second shaft 32 and power the fan 14 and booster compressor 16.

The engine as described above is conventional in configuration and operation and includes multiple compression stages and multiple turbine stages. For example, the booster compressor 16 may have four axial stages including four rows of compressor blades alternating axially with four rows of inlet guide vanes.

Figure 2:
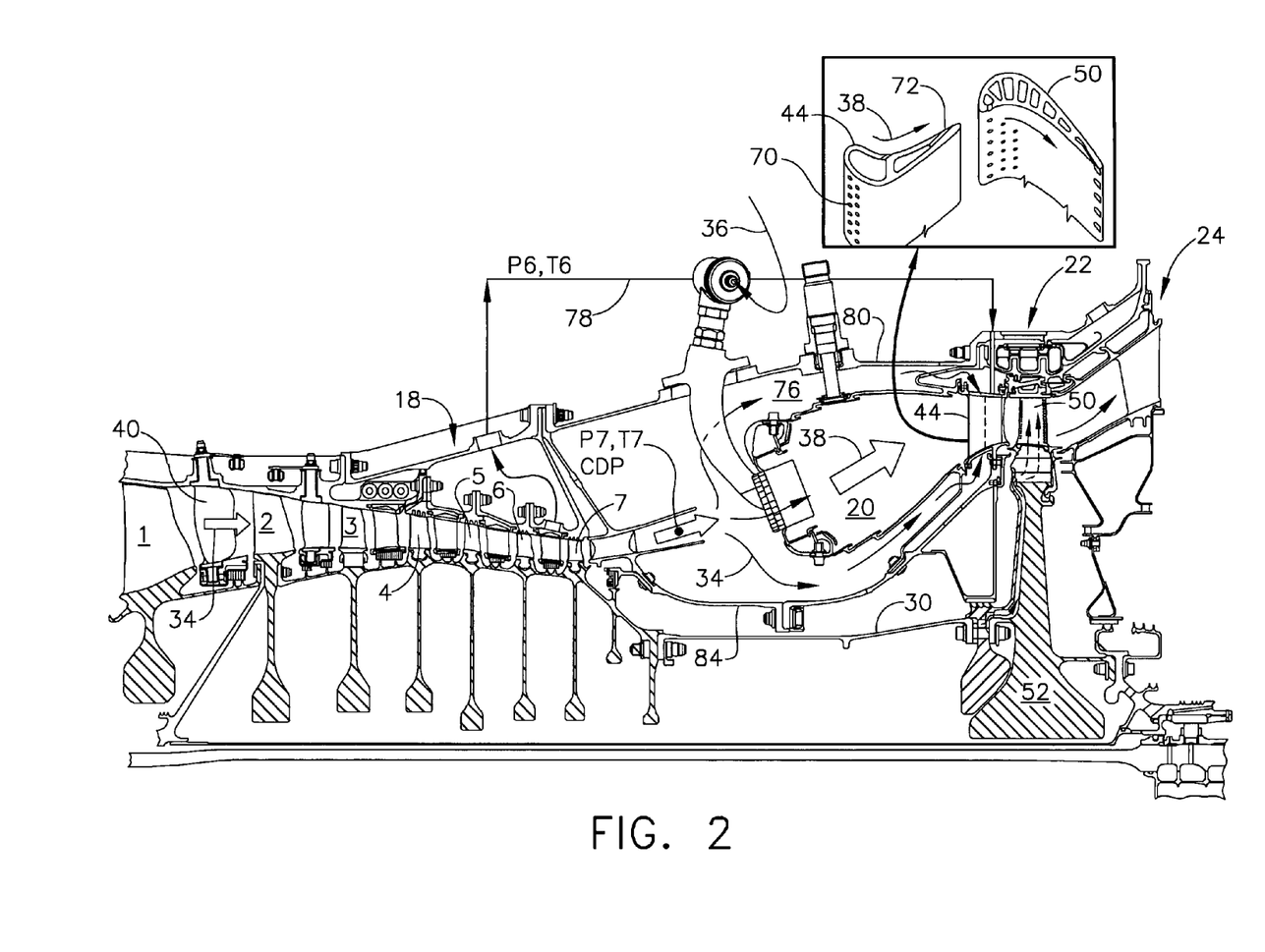
FIG. 2 is an enlarged, axial sectional view through a portion of the core engine illustrated in FIG. 1.

The high pressure compressor 18 may include seven axial stages for example, having seven rows of compressor blades 1-7 as shown in detail in FIG. 2 alternating axially with corresponding rows of inlet guide vanes 40, and discharging the CDP air through a conventional diffuser.

The HPT 22 is preferably a single stage turbine followed in turn by an exemplary five stage LPT 24.

Figure 3:
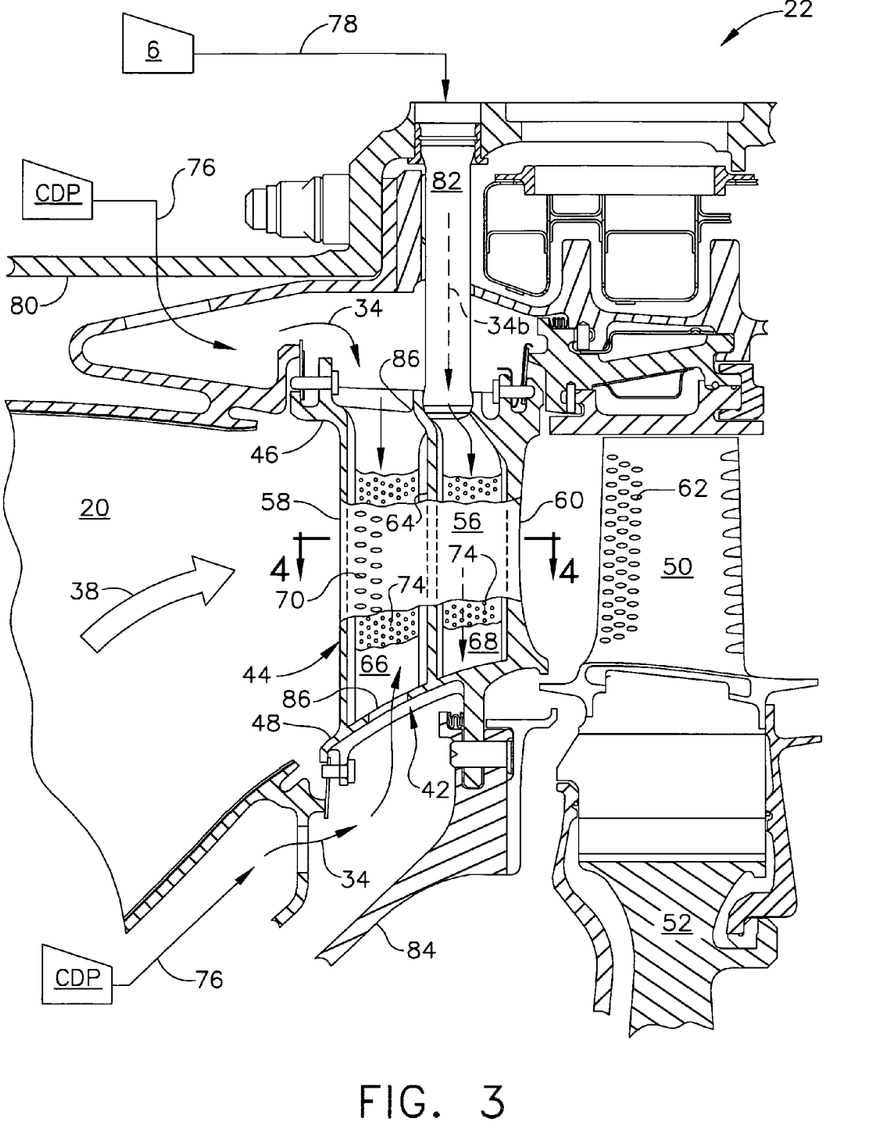
FIG. 3 is an enlarged, axial sectional view of the high pressure turbine illustrated in FIG. 2.
Figure 4:
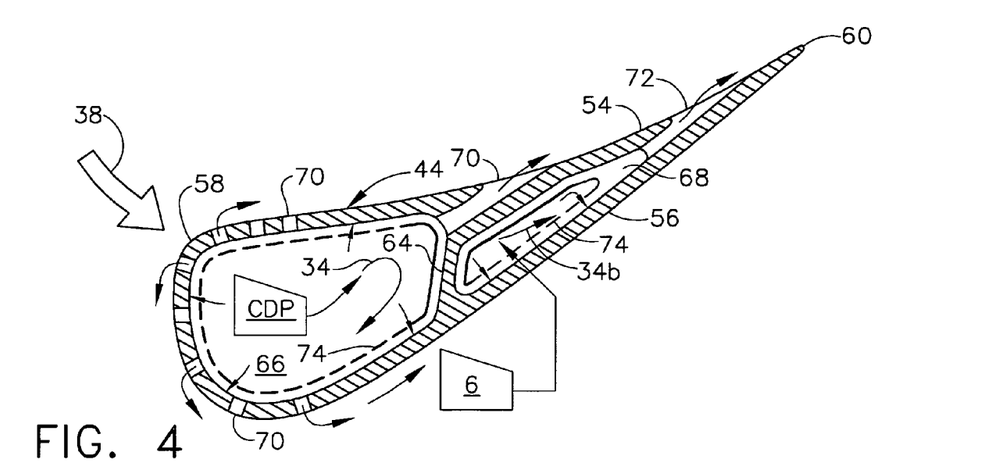
FIG. 4 is a radial sectional view of the nozzle vanes in the high pressure turbine shown in FIG. 3.

FIG. 2 illustrates in more detail the basic core engine including the high pressure compressor 18, annular combustor 20, and HPT 22 disposed in serial flow communication. FIG. 3 illustrates the HPT 22 in more detail. And, FIG. 4 illustrates a radial section of the first stage nozzle vanes.

More specifically, the HPT 22 illustrated in FIG. 2 includes a first stage or HP turbine nozzle 42 having a row of stator vanes 44 integrally joined at opposite ends to outer and inner bands 46,48 as shown in FIG. 3. Following the vanes is a single row of HP turbine blades 50 removably mounted to the perimeter or rim of a first stage or HP rotor disk 52. The disk 52 is fixedly joined to the first drive shaft 30 which in turn is fixedly joined to the rotor disks supporting the compressor blades 1-7 of the high pressure compressor 18.

The configuration and operation of the HP compressor 18 and the basic HPT 22 are conventional for pressurizing the air 34 and expanding the subsequent combustion gases 38 for extracting energy therefrom. In particular, the pressure and temperature of the air 34 increase axially in turn as the air flows downstream through the seven stages of compressor blades 1-7. The seventh row of compressor blades 7 defines the last stage of the compressor in this exemplary configuration and discharges the pressurized air at a maximum pressure P7 and a correspondingly high temperature T7 associated with the compressor discharge pressure (CDP) air.

The CDP air is mixed with the fuel in the combustor to generate the hot combustion gases 38 which are discharged from the outlet of the combustor between the first stage turbine nozzle vanes 44. These vanes are disposed axially between the combustor and the first stage turbine blades 50 and are conventionally configured for dropping or reducing the pressure in the combustion gases along the airfoil chord and across the leading and trailing edges of the vanes.

Each nozzle vane 44 has the typical generally concave pressure side 54 and generally convex, circumferentially opposite suction side 56 extending radially in span and axially in chord between the upstream leading edge 58 and the downstream trailing edge 60 as best shown in FIG. 4.

The contour of the nozzle vanes 44 may be suitably selected to effect a substantial pressure drop as the combustion gases flow downstream between the inlet and outlet ends of the turbine nozzle. Gases flowing through a turbine nozzle are accelerated and turned which causes a small drop in total pressure and a large drop in static pressure.

Correspondingly, the first stage turbine blades 50 illustrated in FIG. 3 have the generally concave pressure side and generally convex opposite suction side extending axially between the leading and trailing edges thereof. The profile of the turbine blades 50 is also conventionally selected for additionally dropping or reducing pressure of the combustion gases 38 along the airfoil chord and across the leading and trailing edges thereof. Work or energy is extracted from the gases flowing between turbine rotor blades which causes a large drop in both total pressure and static pressure.

FIG. 3 illustrates the HPT 22 in more detail, including the turbine blades 50 which require suitable cooling from the hot combustion gases 38 during operation. The blades 50 are typically hollow for providing internal cooling thereof in a conventional manner.

The blades may have any suitable internal cooling configuration such as serpentine cooling channels having one or more inlets at the base of the axial-entry dovetail thereof. An impingement channel may span the length of the airfoil directly behind the leading edge. The internal channel feeds one or more rows of film cooling outlet holes 62 which cover the airfoil sides and provide film cooling thereof as the spent cooling air is discharged from these holes in typical fashion.

Correspondingly, the nozzle vanes 44 illustrated in FIGS. 3 and 4 are also hollow with suitable internal cooling configurations therein. In one embodiment, each vane 44 includes an imperforate bridge or septum 64 bridging the opposite sides 54,56 in a unitary casting therewith. The septum extends the full radial span of each vane to separate the vane into independent and discrete forward and aft cooling channels 66,68 extending directly behind the leading edge and directly in front of the trailing edge, respectively.

As best shown in FIG. 4, the forward portion of each vane 44 includes various rows of first cooling holes 70 extending along the span of the vane and spread apart chordally along both the pressure and suction sides of the vane around the leading edge. These first holes 70 are fed by the forward channel 66 for discharging spent cooling air therefrom in corresponding rows of film cooling air for protecting the external surface of the vane from the leading edge and aft therefrom in a conventional manner.

The aft portion of each vane 44 includes at least one row of second cooling holes 72 extending along the span of the vane closely adjacent to the thin trailing edge 60 as space permits. The second holes 72 are fed by the aft channel 68 for discharging spent cooling air therefrom along the thin trailing edge.

The size and configuration of the various rows of cooling holes 70,72 may be conventional for adequately cooling the nozzle vanes during operation from the heat load generated by the hot combustion gases. The two internal flow channels 66,68 may themselves have any suitable or conventional configuration including turbulators (not shown) for increasing heat transfer as desired, and may also be further defined in serpentine cooling circuits if desired.

In the exemplary embodiment illustrated in FIGS. 3 and 4, each of the two channels 66,68 includes a corresponding impingement baffle 74 having corresponding patterns of small impingement holes for initially discharging the cooling air in impingement jets against the internal surfaces of the vane for enhancing cooling thereof, yet again in any conventional manner. The spent impingement air is then discharged from the various rows of outlet cooling holes 70,72.

In this way, pressurized air may be bled from the compressor and channeled through the internal cooling circuits of the nozzle vanes 44 and blades 50 for providing internal cooling thereof in any conventional manner, with the spent air then being discharged through the various rows of outlet holes found in the pressure and suction sides of the airfoils from the leading edge to the trailing edge.

Whereas the compression stages increase pressure and temperature of the air as energy is added, the turbine stages decrease pressure and temperature of the combustion gases for extracting energy therefrom.

Since the use of a single stage HPT 22 illustrated in FIG. 3 permits a substantial pressure drop to occur in the combustion gases first across the nozzle vanes 44 and then across the turbine blades 50, an improved cooling system for the HPT 22 may be used for further increasing efficiency of the engine.

More specifically, FIG. 2 initially illustrates a first bleed circuit 76 suitably joined in flow communication between the last, or seventh, stage of the HP compressor 18 and the forward cooling channels 66 of the vanes 44 to provide thereto pressurized primary air 34 bled from the compressor at a first pressure and temperature corresponding with full compressor discharge pressure P7, and the associated seventh-stage temperature T7.

Correspondingly, a second or interstage bleed circuit 78 is joined in flow communication between an intermediate or preultimate stage of the compressor 18 and the aft cooling channels 68 of the same vanes 44 to provide dual or compound cooling thereof for enhanced performance and efficiency of the engine. The second circuit 78 bleeds pressurized secondary air 34b at a second pressure and second temperature which are correspondingly lower than the first pressure and first temperature of the primary air 34.

For example, the intermediate compressor stage may be the sixth stage including the sixth row of compressor blades 6, and the pressurized secondary air 34b may be extracted at the following guide vanes with a corresponding sixth-stage pressure P6 and sixth-stage temperature T6 which are substantially lower than the corresponding last-stage pressure P7 and last-stage temperature T7 of the extracted primary air 34.

In this way, both CDP air and non-CDP air may be used together for compound cooling of the first stage vanes 44 for enhanced engine efficiency. The pre-CDP air is less expensive than the CDP air since it has not undergone the full compression cycle, and correspondingly, the temperature of the pre-CDP air is substantially less than the temperature of the CDP air by up to hundreds of degrees.

However, the non-CDP air now being used for cooling the first stage nozzle vanes must be selected from the compressor to ensure adequate backflow margin for those vanes. As shown in FIGS. 3 and 4, the combustion gases 38 are discharged from the outlet end of the combustor and immediately engage the row of nozzle vanes 44 around which the gases split along the opposite pressure and suction sides 54,56.

The combustion gases 38 leave the combustor at maximum pressure and temperature which provide a hostile environment in which the nozzle vanes 44 themselves must be adequately cooled for long life. In view of the pattern of first cooling holes 70 surrounding the leading edge and forward cooling channel 66 of the vanes, that forward channel 66 must be provided with maximum pressure compressor air, in particular the CDP primary air 34.

In this way, all of the first holes 70 which discharge the spent primary air from the forward channel 66 may have a suitable backflow margin to prevent ingestion of the hot combustion gases 38 therein during operation.

In view of the single stage turbine blades 50 disclosed above, the pressure of the combustion gases 38 drops significantly over both the nozzle vanes 44 and the turbine blades 50. Accordingly, the pressure drop across the nozzle vanes may be used to advantage to permit the use of non-CDP air for cooling the aft portion of each nozzle vane surrounding the corresponding aft cooling channels 68 with yet again a suitable backflow margin.

The aerodynamic profile of the nozzle vanes illustrated in FIG. 4 effects relatively high pressure on the pressure side of the vane and relatively low pressure on the suction side 56 of the vane, with the corresponding pressure distributions over the opposite sides of the vane decreasing between the leading and trailing edges of the vane. By preferentially locating the second cooling holes 72 closely adjacent to the vane trailing edge 60, the spent secondary air will engage the lower pressure combustion gases to effect a suitable backflow margin with the correspondingly lower pressure of the secondary air 34b.

For the exemplary seven-stage compressor illustrated in FIG. 2 in cooperation with the single stage HPT 22, the intermediate sixth stage of the compressor may be selected to effect a static pressure in the secondary air 34b bled therefrom which is suitably greater than the static pressure in the combustion gases 38 at the trailing edges 60 of the row of vanes 44 illustrated in FIG. 4 to provide a sufficient backflow margin at the second holes 72 which discharge the spent secondary air from the vanes.

In view of the different pressures of the primary air 34 and secondary air 34b inside each nozzle vane 44, and the correspondingly different pressure distributions of the combustion gases external to the vanes, the two cooling channels 66,68 inside each vane must be isolated from each other to prevent flow communication therebetween.

Accordingly, the septum 64 integrally bridges the opposite sides 54,56 of each vane and extends the full radial span thereof to integrally join the radially outer and inner bands 46,48 as shown in FIGS. 3 and 4, with the septum being imperforate between the two channels 66,68.

Since the forward cooling channel 66 of each vane is supplied with the CDP primary air 34, the various rows of film cooling first holes 70 may be placed around the forward channel in any conventional pattern and configuration while still providing adequate backflow margin for the varying pressure distribution of combustion gases external to the vane.

However, the outlet second holes 72 for the aft channels 68 must be located in relatively low pressure regions of the external combustion gases, such as closely adjacent to the thin trailing edge of the vanes. Correspondingly, the aft channels 68 are preferably imperforate along the high pressure side 54 of each vane, and are also preferably imperforate along the lower pressure suction side 56 of each vane.

In FIG. 4, the walls defining the aft cooling channel 68 are imperforate along both the pressure and suction sides of the vane, and along the septum 64, with the second holes 72 extending aft through the pressure side 54 immediately short of the thin trailing edge 60 where space permits.

In this way, the second holes 72 terminate as close as possible to the trailing edge 60 on the pressure side of the vane wherein the pressure distribution of the external combustion gases rapidly decreases to the trailing edge. The pressure requirements for the secondary air 34*b* may therefore be minimized to permit the use of the sixth stage compressor bleed air in this exemplary embodiment.

As shown in FIG. 4, the pattern of first holes 70 surrounding the forward channel 66 includes a row of aft holes extending aft from the forward channel along both the pressure side 54 and in part along the aft channel 68 to discharge a portion of the spent primary air toward the outlet ends of the second holes 72. In this way, both channels 66,68 are internally cooled by the respective primary and secondary air, using the corresponding impingement baffles 74 for example, with the spent cooling air being discharged through the various rows of first and second holes 70,72.

The discharge air forms corresponding films which provide thermal insulation over the vane external surface as they flow downstream toward the trailing edge 60. The aft row of first holes 70 provides additional convection cooling of the vane pressure side 54 where it bounds the aft channel 68 and discharges its spent cooling air in a protective film over the aft portion of the aft channel 68.

Correspondingly, some of the spent primary air is discharged from the forward channel 66 and first holes 70 along the suction side of the vane and flows aft towards the trailing edge in a protective film along the suction side of the aft channel 68.

The axial or chordal location of the septum 64 between the opposite leading and trailing edges of the vane may be selected in conjunction with the specific distribution of pressure in the external combustion gases and the specific pressures of the CDP primary air 34 and the interstage secondary air 34*b*.

FIG. 2 illustrates the basic configuration of the core engine including the compressor 18, combustor 20, and HPT 22. The first cooling circuit 76 for providing the CDP primary air 34 to the nozzle vanes 44 may have any conventional configuration suitably modified to permit the introduction of the second circuit 78 for the same vanes. For example, the engine further includes an annular outer case 80 surrounding the combustor 20 and nozzle 42 to define a portion of the first circuit 76 from the outlet end of the compressor 18 to the nozzle 42.

The second circuit 78 may have any conventional configuration for bleeding pre-CDP air from the compressor 18 which typically commences in the compressor case supporting the guide vanes immediately aft of the sixth stage compressor blades 6. The second circuit 78 includes suitable conduits or tubes to carry the secondary bleed air 34*b* to the outer case surrounding the nozzle vanes 44.

As shown in FIG. 3, the outlet or discharge end of the second circuit 78 is defined by a plurality of radial tubes or spoolies 82 extending radially inwardly through the outer case 80 to the outer band 46 of the nozzle 42.

The outer and inner bands 46,48 of the nozzle may be conventionally cooled by the primary CDP air 34 from the first circuit 76 which is separated from the second circuit 78 by the spoolies 82.

FIG. 2 also illustrates the conventional annular inner case 84 disposed radially inwardly of the combustor 20 to define another portion of the first circuit 76. Both the combustor 20 and turbine nozzle 42 are typically mounted from the inner case 84, and a portion of the CDP air is suitably channeled to cool the nozzle inner band 48.

As shown in FIG. 3, the outer and inner bands 46,48 have corresponding outer and inner inlets 86 for each of the vanes 44 which define the outlet or discharge ends of the first circuit 76 for feeding the primary air into the forward channels 66 from both ends of the vanes.

Correspondingly, the inner band 48 is imperforate below the aft channel 68 and typically includes a mounting flange for supporting the nozzle to the inner case 84. The outer band 46 includes corresponding inlets above the aft channels 68 in which the corresponding spoolies 82 are sealingly connected.

Accordingly, the first stage turbine nozzle 42 illustrated in FIG. 3 may be specifically modified for receiving pressurized cooling air from different sources in the compressor for compound cooling thereof and maximizing turbine and engine efficiency. The CDP primary air 34 is suitably bled from the last stage of the compressor 18 to the forward cooling channels 66 in each of the nozzle vanes 44 for initially effecting internal cooling thereof, and the spent air is discharged from the pattern of first cooling holes 70 therein.

The pre-CDP secondary air 34*b* is independently bled from a suitable intermediate stage of the compressor 18 to the aft cooling channels 68 in the same vanes 44 for internal cooling thereof and then discharged from the row of second holes 72. The secondary air 34*b* not only has lower pressure than the CDP primary air but has significantly lower temperature for improving its ability to efficiently cool the aft portion of the nozzle vanes.

The single stage HPT 22 illustrated in FIG. 3 permits a substantial drop in pressure in the combustion gases 38 across the leading and trailing edges 58,60 of the vanes 44 to permit the use of dual-pressure air sources with acceptable backflow margins over the different forward and aft portions of the vanes. The secondary air 34*b* may be bled from the intermediate stage at a static pressure which is greater than the static pressure of the combustion gases 38 along the vane trailing edges 60 at which the second holes 72 terminate for providing a suitable backflow margin thereat notwithstanding the lower pressure of the secondary air.

As shown in FIG. 2, the combustion gases next flow to the row of turbine blades 50, which are also hollow and include suitable internal cooling circuits for cooling thereof. The cooling of the turbine blades 50 is independent of cooling of the nozzle vanes 44 and may have any conventional configuration.

As indicated above, the aerodynamic profile of the individual nozzle vanes 44 controls the corresponding pressure distribution of the external combustion gases 38 flowing downstream over the opposite pressure and suction sides of the vanes. The pressure distribution around the nozzle vanes is also dependent upon the specific configuration of the turbine rotor blades themselves and the number of stages therein. For the single stage HPT 22, a substantial pressure drop occurs in the combustion gases over the nozzle vanes.

Figure 5:
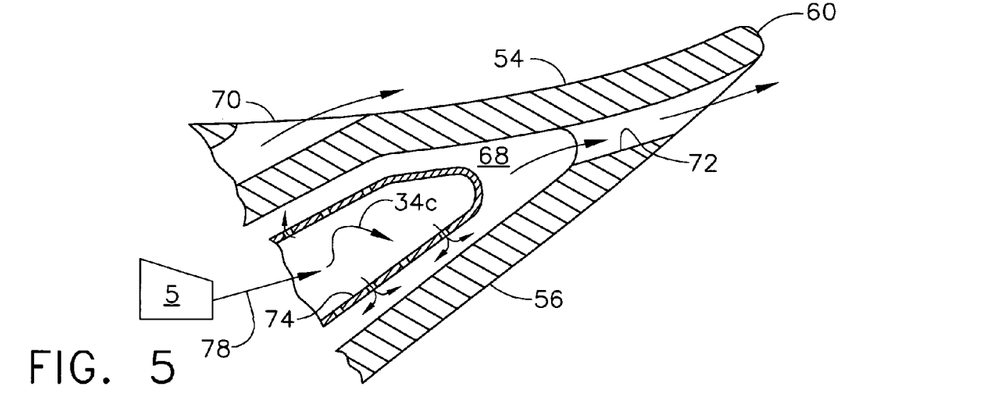
FIG. 5 is an enlarged sectional view of the trailing edge portion of the nozzle vane illustrated in FIG. 4 in accordance with another embodiment.
Figure 6:
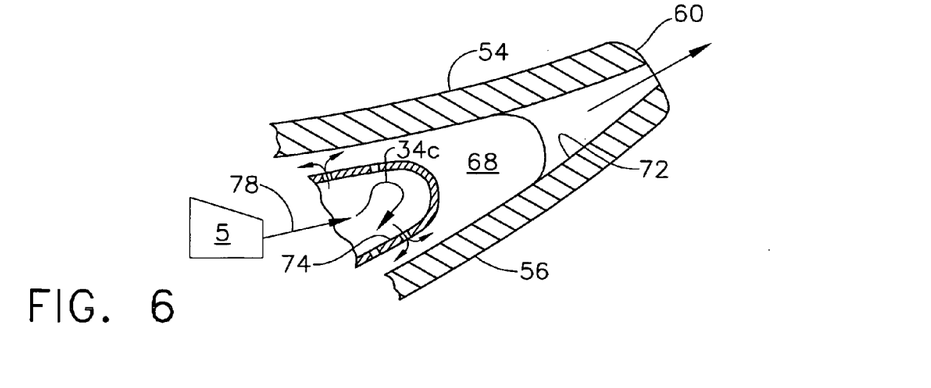
FIG. 6 is an enlarged sectional view of the trailing edge portion of the nozzle vanes illustrated in FIG. 4 in accordance with another embodiment.

FIGS. 5 and 6 show corresponding modifications of the aft ends of the nozzle vane 44 illustrated in FIG. 4, and are otherwise identical thereto.

In FIG. 5, the second holes 72 extend aft through the suction side 56 of the vane immediately short of the trailing edge 60 where space permits. The pressure side of the aft channel 68 is therefore imperforate over the full axial extent of the aft channel. The suction side of the aft channel 68 is also correspondingly imperforate, with the second holes 72 extending aft therefrom.

Since the pressure of the external combustion gases is lower on the suction side of the vane than on the pressure side, then an even lower pressure intermediate stage, such as the fifth stage of the compressor 18 illustrated in FIG. 2 may be used to provide the secondary bleed air 34c to the aft cooling channels 68 of the row of vanes.

The second circuit 78 illustrated in FIG. 2 may be suitably modified to bleed the fifth stage compressor air instead of the sixth stage air. The fifth stage air has correspondingly lower pressure and temperature than the sixth stage air and may be used for further increasing efficiency of cooling the vanes and efficiency of the turbine itself. Correspondingly, a suitable backflow margin may be maintained at the second holes 72 on the airfoil suction side using the lower pressure fifth stage bleed air.

FIG. 6 illustrates yet another modification of the aft end of the nozzle vanes 44 illustrated in FIG. 4 and is otherwise identical thereto. In this embodiment, the second circuit 78 again begins at the compressor fifth stage instead of the sixth stage for providing the lower pressure secondary air 34c to the aft cooling channels 68 in the row of vanes. In this embodiment, the trailing edge 60 may be suitably thicker for placing the second holes 72 between the opposite pressure and suction sides 54,56 of the vane for discharging the spent secondary air 34c directly at the trailing edge 60. Correspondingly, the aft channels 68 are completely imperforate on the opposite pressure and suction sides of the vane.

The different configurations of the vane trailing edge illustrated in FIGS. 4-6 may be used to advantage to best match the specific distribution in external pressure of the combustion gases at the thin trailing edge of the vanes with the pressure of the selected intermediate stage of the compressor to ensure backflow margin at the second holes 72. Any interstage bleed air from the compressor can improve the cooling performance of the nozzle vanes and increase engine efficiency, but must nevertheless have sufficient pressure to ensure adequate backflow margin around the aft cooling channels 68.

The compound effect of using both CDP primary air for cooling the forward portions of the nozzle vanes and the non-CDP secondary air for cooling the aft portions of the vanes may be used to advantage for improving cooling performance of the nozzle vanes themselves as well as increasing overall efficiency of the high pressure turbine and engine.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

We claim:

1. A gas turbine engine comprising:
    a fan, compressor, combustor, high pressure (HP) turbine, and low pressure turbine in serial flow communication;
    said compressor including rows of compressor blades for pressurizing air sequentially in corresponding stages;
    said HP turbine including a nozzle having a row of stator vanes followed by a row of rotor blades;
    each of said vanes having circumferentially opposite pressure and suction sides extending in span radially and in chord axially between opposite leading and trailing edges, and being hollow with an imperforate septum bridging said opposite sides to define forward and aft cooling channels feeding corresponding first cooling holes along said leading edge and second cooling holes along said trailing edge;
    a first bleed circuit joined in flow communication between a last stage of said compressor and said vane forward channels to provide thereto pressurized primary air at a first pressure; and
    a second bleed circuit joined in flow communication between an intermediate stage of said compressor and said vane aft channels to provide thereto pressurized secondary air at a second pressure less than said first pressure.

2. An engine according to claim 1 wherein said aft channels are imperforate along both said pressure and suction sides, and said second holes extend aft therefrom toward said trailing edges.

3. An engine according to claim 2 wherein said intermediate stage is configured to effect a static pressure in said secondary air greater than static pressure in combustion gases at said trailing edges to provide a backflow margin at said second holes.

4. An engine according to claim 3 wherein said first holes include a row of aft holes extending aft from said forward channel along both said pressure side and said aft channel.

5. An engine according to claim 4 further comprising:
    an outer case surrounding said combustor and nozzle to define said first circuit from said compressor to said nozzle; and
    a plurality of spoolies extending radially through said outer case to said nozzle to define an outlet end of said second circuit.

6. An engine according to claim 5 wherein said second holes extend aft through said pressure side short of said trailing edge.

7. An engine according to claim 5 wherein said second holes extend aft through said suction side short of said trailing edge.

8. An engine according to claim 5 wherein said second holes extend aft through said trailing edge between said pressure and suction sides which are imperforate thereat.

9. An engine according to claim 5 further comprising:
    an inner case disposed radially inwardly of said combustor to further define said first circuit; and
    said outer and inner bands have corresponding outer and inner inlets corresponding with each of said vanes to define a discharge end of said first circuit.

10. A method of cooling said nozzle vanes according to claim 5 comprising:
    bleeding said primary air through said first bleed circuit from said last stage of said compressor to said forward cooling channels in said vanes for discharge from said row of vane aft holes; and bleeding said secondary air through said second bleed circuit from said intermediate stage of said compressor to said aft cooling channels in said vanes for discharge from said second holes.

11. A gas turbine engine comprising:

a multistage compressor disposed in serial flow communication with a combustor and high pressure (HP) turbine;

said turbine including a nozzle having a row of stator vanes followed by a row of rotor blades;

each of said vanes including a forward cooling channel feeding first cooling holes, and an aft cooling channel feeding second cooling holes;

a first bleed circuit joined in flow communication between a last stage of said compressor and said vane forward channels to provide thereto pressurized primary air at a first pressure; and a second bleed circuit joined in flow communication between an intermediate stage of said compressor and said vane aft channels to provide thereto pressurized secondary air at a second pressure less than said first pressure.

12. An engine according to claim 11 wherein:

said nozzle further comprises radially outer and inner bands integrally joined to corresponding end of said vanes, and each of said vanes further includes chordally opposite leading and trailing edges and a septum extending radially between said bands to separate said forward and aft channels;

said first holes are disposed near said leading edges, and said second holes are disposed near said trailing edges; and said intermediate stage is configured to effect a static pressure in said secondary air greater than static pressure in combustion gases at said trailing edges to provide a backflow margin at said second holes.

13. An engine according to claim 12 wherein:

each of said vanes further includes a concave pressure side and an opposite, convex suction side, and said septum bridges said opposite sides to isolate said forward and aft channels;

said aft channel is imperforate along said pressure side; and said second holes extend aft from said aft channel.

14. An engine according to claim 13 wherein said aft channel is imperforate along said suction side.

15. An engine according to claim 13 wherein said first holes include a row of aft holes extending aft from said forward channel along both said pressure side and said aft channel.

16. An engine according to claim 13 wherein said second holes extend aft through said pressure side short of said trailing edge.

17. An engine according to claim 13 wherein said second holes extend aft through said suction side short of said trailing edge.

18. An engine according to claim 13 wherein said second holes extend aft through said trailing edge between said pressure and suction sides which are imperforate thereat.

19. An engine according to claim 13 further comprising:

an outer case surrounding said combustor and nozzle to define said first circuit from said compressor to said nozzle; and a plurality of spoolies extending radially through said outer case to said nozzle to define an outlet end of said second circuit.

20. An engine according to claim 19 further comprising:

an inner case disposed radially inwardly of said combustor to further define said first circuit; and said outer and inner bands have corresponding outer and inner inlets corresponding with each of said vanes to define a discharge end of said first circuit.

21. A method of cooling first stage nozzle vanes following in turn a combustor and compressor in a gas turbine engine, comprising:

bleeding primary air from the last stage of said compressor to a forward cooling channel in said vanes for discharge from first cooling holes therein; and bleeding secondary air from an intermediate stage of said compressor to an aft cooling channel in said vanes for discharge from second cooling holes therein.

22. A method according to claim 21 further comprising:

dropping pressure in combustion gases across leading and trailing edges of said vanes; and bleeding said secondary air from said intermediate stage at a static pressure greater than the static pressure of said combustion gases along said vane trailing edges.

* * * * *